US012737719B2

(12) United States Patent
Campos

(10) Patent No.: US 12,737,719 B2
(45) Date of Patent: Sep. 15, 2026

(54) SYSTEMS AND METHODS FOR DISPLAYING ITEMS FOR PURCHASE

(71) Applicant: Walmart Apollo, LLC, Bentonville, AR (US)

(72) Inventor: Jonathan Isaac Strey Campos, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 272 days.

(21) Appl. No.: 18/370,256

(22) Filed: Sep. 19, 2023

(65) Prior Publication Data

US 2024/0095668 A1 Mar. 21, 2024

Related U.S. Application Data

(60) Provisional application No. 63/407,802, filed on Sep. 19, 2022.

(51) Int. Cl.
*G06Q 10/087* (2023.01)
*G06Q 10/083* (2024.01)
*G06Q 30/0601* (2023.01)

(52) U.S. Cl.
CPC ......... *G06Q 10/087* (2013.01); *G06Q 10/083* (2013.01); *G06Q 30/0633* (2013.01); *G06Q 30/0641* (2013.01)

(58) Field of Classification Search
CPC ............... G06Q 10/087; G06Q 10/083; G06Q 30/0633; G06Q 30/0641
See application file for complete search history.

(56) References Cited

U.S. PATENT DOCUMENTS 8,346,676 B1 1/2013 Bennett
8,615,473 B2 12/2013 Spiegel
(Continued)

FOREIGN PATENT DOCUMENTS

KR 20220030811 A 3/2022
WO 2019014182 A1 1/2019

OTHER PUBLICATIONS

Fisher, J. (2019). First consumer drone delivery service takes off in Virginia. FleetOwner Executive Insight, N.PAG. (Year: 2019).*
(Continued)

*Primary Examiner* — Ashford S Hayles
(74) *Attorney, Agent, or Firm* — Fitch, Even, Tabin & Flannery, LLP

(57) ABSTRACT

In some embodiments, apparatuses and methods are provided herein useful to displaying items for purchase. In some embodiments, there is provided a system for displaying items for purchase from a retailer including a control circuit and a retail application. In some embodiments the control circuit determines inventory items to include in a listing of selectable items for potential purchase; outputs signaling to cause a retail application to display the listing of selectable items; receives an indication of a customer selection; determines subsequent inventory items to include in an updated listing based on at least one of a corresponding dimensional space or a corresponding weight of each of the subsequent inventory items, and a remaining available storage capacity of a delivery container; and outputs subsequent signaling to cause the retail application to display the updated listing.

16 Claims, 17 Drawing Sheets

(56) References Cited

U.S. PATENT DOCUMENTS 8,712,924 B2 4/2014 Marks
9,448,718 B2 9/2016 Howard
9,494,937 B2 11/2016 Siegel
9,792,576 B1 10/2017 Jamjoom
9,990,645 B1 6/2018 Emigh
10,048,697 B1 8/2018 Theobald
10,198,749 B1 2/2019 Haskin
10,387,825 B1 * 8/2019 Canavor .............. G06Q 10/083
10,403,155 B2 * 9/2019 Kimchi .................. B64U 50/19
10,457,392 B1 * 10/2019 Evans ...................... G08G 5/55
10,467,581 B2 11/2019 Laury
10,943,289 B2 * 3/2021 Mattingly .......... G06Q 30/0633
11,074,545 B2 * 7/2021 Winkle ................ G05D 1/0676
11,099,562 B1 * 8/2021 Ebrahimi Afrouzi ........................ G05D 1/0088
11,348,057 B2 5/2022 Cantrell
11,610,175 B2 3/2023 Cantrell
11,829,898 B2 11/2023 Cantrell
12,154,061 B2 * 11/2024 Barrington ........... G05D 1/0088
12,354,051 B2 7/2025 Cantrell
2008/0010223 A1 1/2008 Hoffman
2013/0060712 A1 3/2013 Esmaili
2014/0032034 A1 * 1/2014 Raptopoulos ............ G08G 5/55 701/25
2014/0278876 A1 9/2014 Lindstrom
2014/0279657 A1 9/2014 Stowe
2015/0254758 A1 * 9/2015 Wadhawan ........ G06Q 30/0641 705/26.7
2015/0290795 A1 10/2015 Oleynik
2016/0068264 A1 * 3/2016 Ganesh .................... G08G 5/55 701/4
2016/0321600 A1 11/2016 Abutbul
2017/0011340 A1 1/2017 Gabbai
2017/0075962 A1 3/2017 Hitchcock
2017/0124576 A1 5/2017 Lagoni
2017/0154302 A1 6/2017 Streebin
2017/0169385 A1 6/2017 High
2017/0203857 A1 * 7/2017 O'Toole .................... B64F 1/32
2017/0220979 A1 * 8/2017 Vaananen ............ G06Q 10/083
2017/0286892 A1 * 10/2017 Studnicka .......... G06Q 20/3224
2017/0361942 A1 12/2017 Jalaldeen
2018/0058864 A1 * 3/2018 Lection .............. G01C 21/3415
2018/0082353 A1 * 3/2018 Mattingly .......... G06Q 30/0635
2018/0137454 A1 * 5/2018 Kulkarni .............. G06Q 10/083
2018/0150798 A1 * 5/2018 Wilkinson ....... G06Q 10/08355
2018/0374033 A1 * 12/2018 Beecham ............. G06Q 10/083
2019/0014182 A1 1/2019 Brooks
2019/0019143 A1 * 1/2019 Cantrell ............. G06Q 10/0833
2019/0095862 A1 * 3/2019 Kilzer .............. G06Q 10/08355
2019/0235501 A1 * 8/2019 Cantrell .......... B60W 60/00256
2019/0259232 A1 * 8/2019 Nandakumar ..... G07C 9/00896
2019/0263521 A1 * 8/2019 O'Brien ................... B64D 1/12
2019/0271988 A1 * 9/2019 High .................. G01C 21/3407
2020/0090255 A1 * 3/2020 Rodriguez Bravo ... G01W 1/10
2020/0134555 A1 4/2020 Anand
2020/0160265 A1 * 5/2020 Urban ................ G06Q 10/0832
2020/0167722 A1 * 5/2020 Goldberg ........... G06Q 10/0832
2020/0202284 A1 * 6/2020 Singh ..................... G05D 1/101
2020/0372455 A1 * 11/2020 High ....................... H04W 4/35
2022/0027847 A1 1/2022 Loubriel
2022/0036310 A1 * 2/2022 Heinla .................. G06Q 10/08
2022/0044198 A1 2/2022 Meister
2022/0130265 A1 * 4/2022 Bash ........................ G08G 5/21
2022/0164757 A1 * 5/2022 Des Ligneris ... G06Q 10/06312
2022/0300897 A1 9/2022 Cantrell
2022/0383238 A1 * 12/2022 Malloy ................ G06Q 10/083
2023/0196266 A1 6/2023 Cantrell
2024/0037487 A1 * 2/2024 Clise ..................... B64C 39/024
2024/0062143 A1 * 2/2024 Cantrell ................ G06F 3/0482
2024/0161049 A1 * 5/2024 Vaananen ............ G06Q 10/083
2024/0202648 A1 * 6/2024 Alderfer ............ G06Q 10/0832

OTHER PUBLICATIONS

Global Commercial UAV Markets 2021-2026: Leading Use Cases and Apps in Industry Verticals are Driving Major UAV Market Growth. (2021). PR Newswire US. (Year: 2021).*

Walmart and DroneUp Announce First Multi-Site Commercial Drone Delivery Operations. (2021). PR Newswire US. (Year: 2021).*

Fuelio: Gas log & costs—Android Apps on Google Play, https://play.google.com/store/apps/details?id=com.kajda.fuelio&hl=en, last viewed Mar. 31, 2017.

International Search Report and Written Opinion from related International Patent Application No. PCT/US2018/041394 issued Oct. 4, 2018.

PCT; App. No. PCT/US2018/041394; International Preliminary Report on Patentability mailed Jan. 14, 2020; (5 pages).

Shipping Rates Manager, Developed by Decimal, https://apps.shopify.com/decimal, last viewed Mar. 31, 2017.

U.S. Appl. No. 16/030,939; Notice of Allowance mailed Feb. 1, 2022; (9 pages).

U.S. Appl. No. 17/825,852; Non-Final Rejection mailed Nov. 8, 2022; (pp. 1-12).

U.S. Appl. No. 17/825,852; Notice of Allowance and Fees Due (PTOL-85) mailed Nov. 16, 2022; (pp. 1-7).

U.S. Appl. No. 18/172,163; Notice of Allowance and Fees Due (PTOL-85) mailed Jul. 25, 2023; (pp. 1-7).

Guha, A. (2000). Development of an iterative heuristic-based framework for the container loading problem (Order No. 1403334). Available from ProQuest Dissertations and Theses Professional. (250244378). (Year: 2000).

U.S. Appl. No. 18/382,924; Final Rejection mailed Jan. 8, 2025; (pp. 1-15).

U.S. Appl. No. 18/382,924; Non-Final Rejection mailed Jul. 25, 2024; (pp. 1-13).

U.S. Appl. No. 18/382,924; Notice of Allowance and Fees Due (PTOL-85) mailed Apr. 25, 2025; (pp. 1-7).

* cited by examiner

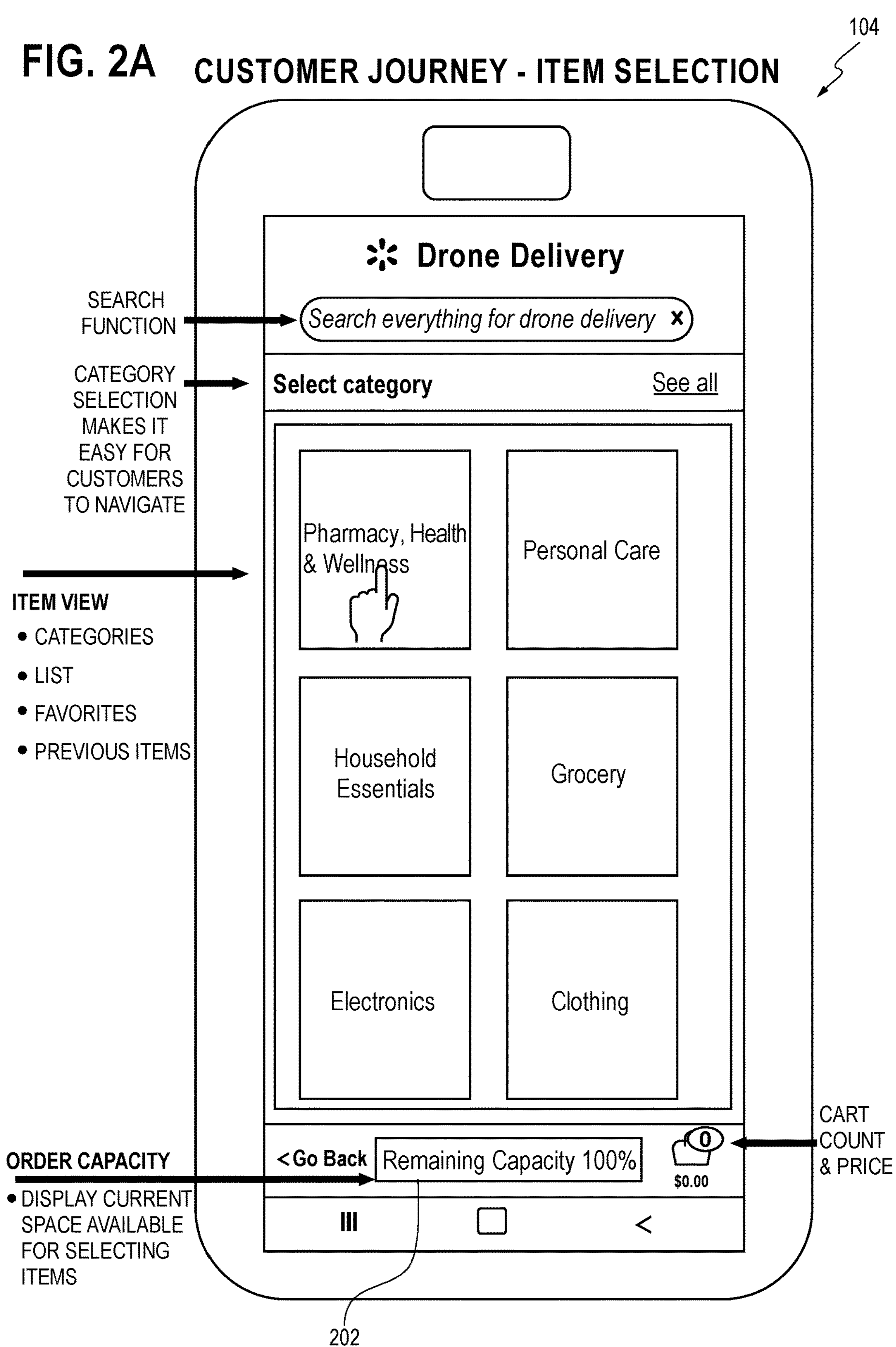
FIG. 2A
CUSTOMER JOURNEY - ITEM SELECTION
104
Drone Delivery
SEARCH FUNCTION
Search everything for drone delivery
CATEGORY SELECTION MAKES IT EASY FOR CUSTOMERS TO NAVIGATE
Select category
See all
Pharmacy, Health & Wellness
Personal Care
ITEM VIEW
• CATEGORIES
• LIST
• FAVORITES
• PREVIOUS ITEMS
Household Essentials
Grocery
Electronics
Clothing
CART COUNT & PRICE
0
$0.00
ORDER CAPACITY
• DISPLAY CURRENT SPACE AVAILABLE FOR SELECTING ITEMS
<Go Back
Remaining Capacity 100%
202

FIG. 2D

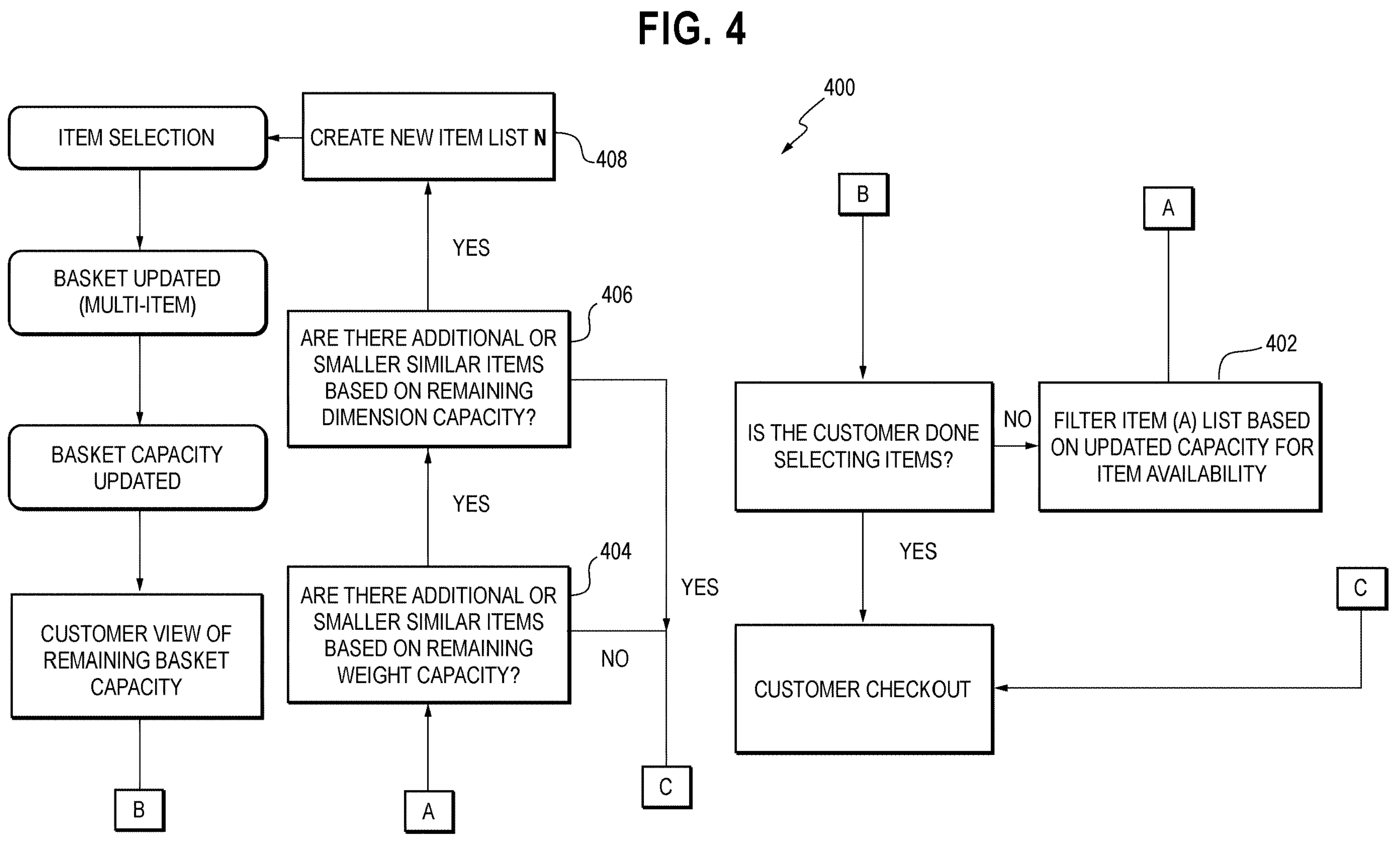
FIG. 4
400
ITEM SELECTION
CREATE NEW ITEM LIST N
408
BASKET UPDATED (MULTI-ITEM)
YES
ARE THERE ADDITIONAL OR SMALLER SIMILAR ITEMS BASED ON REMAINING DIMENSION CAPACITY?
406
BASKET CAPACITY UPDATED
YES
ARE THERE ADDITIONAL OR SMALLER SIMILAR ITEMS BASED ON REMAINING WEIGHT CAPACITY?
404
YES
NO
CUSTOMER VIEW OF REMAINING BASKET CAPACITY
B
A
C
B
IS THE CUSTOMER DONE SELECTING ITEMS?
NO
A
FILTER ITEM (A) LIST BASED ON UPDATED CAPACITY FOR ITEM AVAILABILITY
402
YES
CUSTOMER CHECKOUT
C 500
CAPACITY
WEIGHT = LBS
DIMENSIONS (INCHES)
LENGTH = L
WIDTH = W
HEIGHT = H
POP LOGIC
START OF PROGRAM
ITEM AVAILABILITY LIST IS DETERMINED BY CAPACITY
ITEM LIST (A) POPULATES
CREATE EVENT/PROMO FILTER LIST (EP)
EP ITEM(S) SELECTED
YES
IS THE CUSTOMER INTERESTED IN LOOKING AT ITEMS FROM AN EVENT OR PROMO?
NO
ITEM SELECTION
A

FIG. 5C

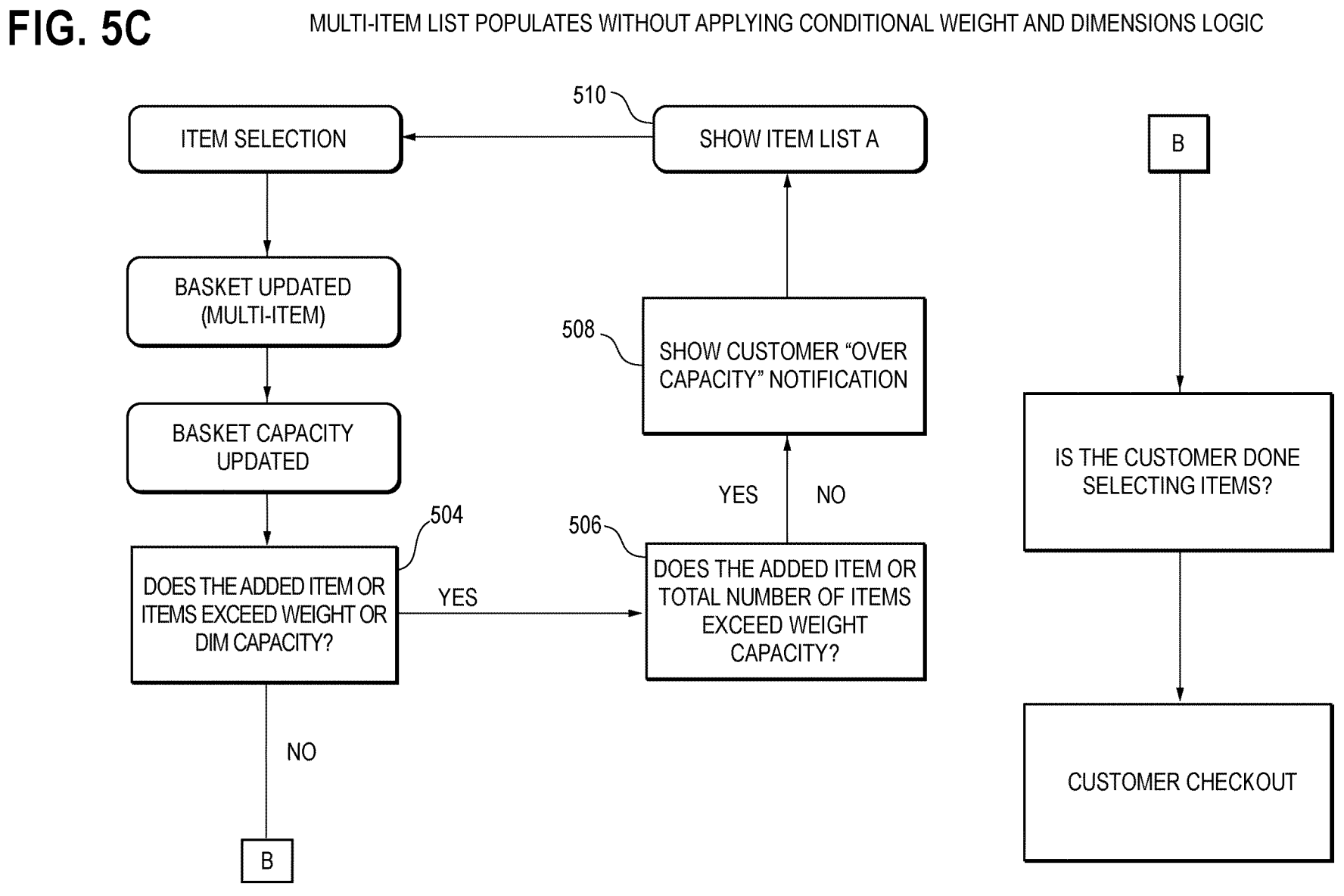

MULTI-ITEM LIST POPULATES WITHOUT APPLYING CONDITIONAL WEIGHT AND DIMENSIONS LOGIC

ITEM SELECTION

BASKET UPDATED (MULTI-ITEM)

BASKET CAPACITY UPDATED

504 DOES THE ADDED ITEM OR ITEMS EXCEED WEIGHT OR DIM CAPACITY?

YES

NO

B

506 DOES THE ADDED ITEM OR TOTAL NUMBER OF ITEMS EXCEED WEIGHT CAPACITY?

YES

NO

508 SHOW CUSTOMER “OVER CAPACITY” NOTIFICATION

510 SHOW ITEM LIST A

B

IS THE CUSTOMER DONE SELECTING ITEMS?

CUSTOMER CHECKOUT

SYSTEMS AND METHODS FOR DISPLAYING ITEMS FOR PURCHASE

CROSS-REFERENCE TO RELATED APPLICATION

This application claims the benefit of U.S. Provisional Application No. 63/407,802 filed Sep. 19, 2022, which is incorporated herein by reference in its entirety.

TECHNICAL FIELD

This invention relates generally to displaying items for purchase from a retailer.

BACKGROUND

When virtually shopping for products from a retailer's website or application for delivery, a customer can search for products by entering at least a portion of a product name or product type category in a search query field, and is presented with multiple potentially matching products. Alternatively, a customer can select a category of product types (e.g., electronics, groceries) and is presented products for selection that are in the selected category. In either case, the items displayed for the customer are determined for display as a function of the query and/or selected product type category.

BRIEF DESCRIPTION OF THE DRAWINGS

Disclosed herein are embodiments of systems, apparatuses and methods pertaining to displaying items for purchase from a retailer. This description includes drawings, wherein:

FIG. 2A-2G are schematic illustrations of an example retail application for displaying items for purchase from a retailer in accordance with some embodiments;

FIG. 4 shows a flow diagram of an exemplary method 400 of displaying items for purchase from a retailer in accordance with some embodiments;

FIGS. 5A-5C show a flow diagram of an exemplary method 500 of displaying items for purchase from a retailer in accordance with some embodiments;

Figure 1:
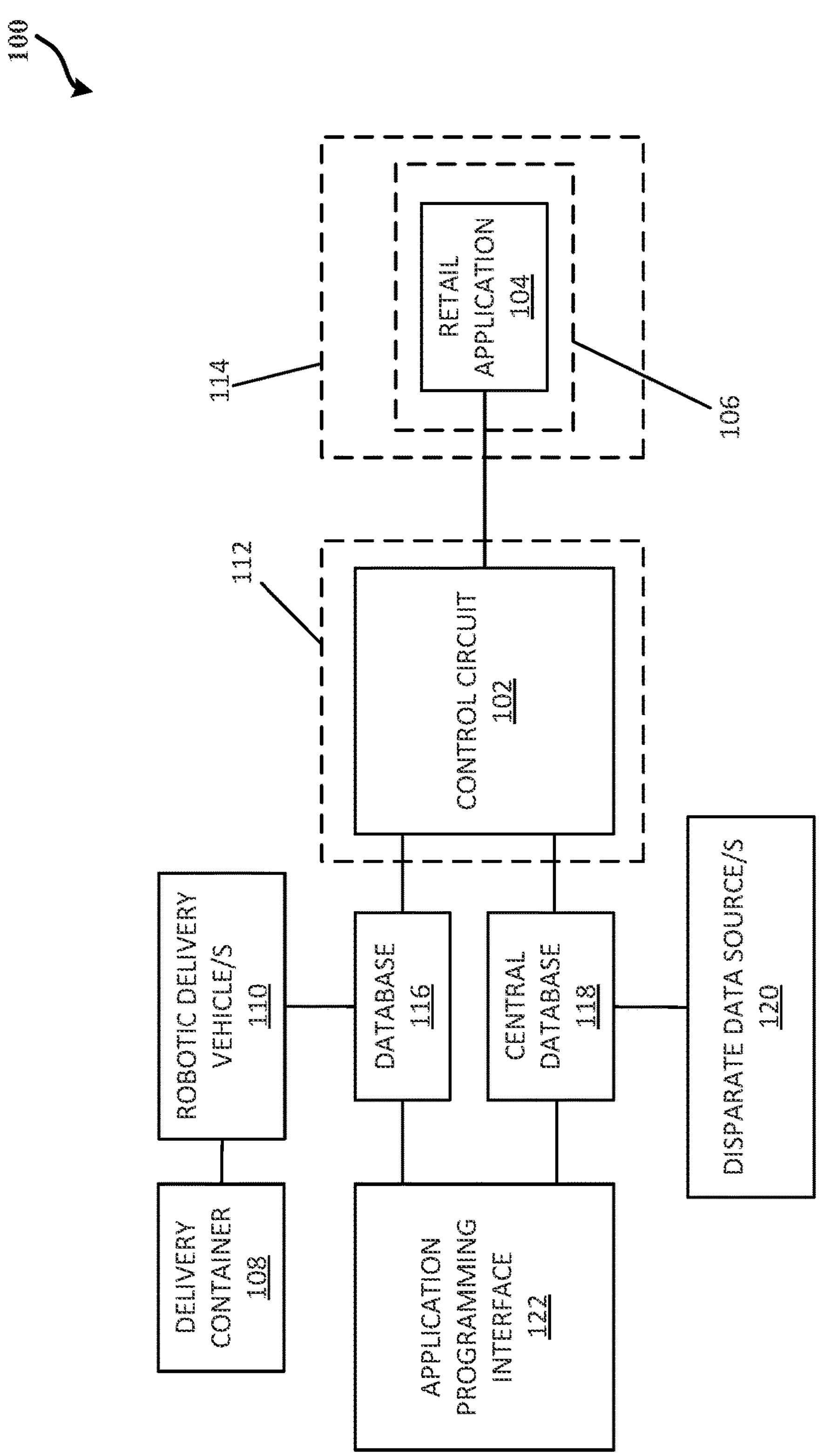
FIG. 1 illustrates a simplified block diagram of an exemplary system for displaying items for purchase from a retailer in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for displaying items for purchase from a retailer. In some embodiments, a system for displaying items for purchase from a retailer includes a control circuit. In some embodiments, the control circuit may determine inventory items to include in a listing of selectable items for potential purchase by a customer that will be delivered to the customer using a delivery container that is a part of or carried by an aerial or ground based robotic delivery vehicle based on at least one of a corresponding dimensional space or a corresponding weight of each of the inventory items, and an available storage capacity of the delivery container. Alternatively or in addition to, the control circuit outputs signaling to cause a retail application executable by a customer device to display the listing of selectable items for potential purchase. Alternatively or in addition to, the control circuit receives an indication of a customer selection of one of the selectable items. Alternatively or in addition to, the control circuit determines subsequent inventory items to include in an updated listing of selectable items for potential purchase by the customer that will be delivered to the customer using the delivery container that is the part of or carried by the aerial or ground based robotic delivery vehicle based on at least one of the corresponding dimensional space or the corresponding weight of each of the subsequent inventory items, and a remaining available storage capacity of the delivery container. In some embodiments, each item in the updated listing of selectable items is qualified for inclusion in the remaining available storage capacity. Alternatively or in addition to, the control circuit outputs subsequent signaling to cause the retail application executable by the customer device to display the updated listing of selectable items for potential purchase.

In some embodiments, the system includes the retail application including computer code executable on the customer device and configured to display listings of selectable items for potential purchase on a display of the customer device and allow the customer to select one or more of the items for purchase. Each selection may result in an updated listing displayed by the customer device.

In some embodiments, a method for displaying items for purchase from a retailer includes determining, by a control circuit, inventory items to include in a listing of selectable items for potential purchase by a customer that will be delivered to the customer using a delivery container that is a part of or carried by an aerial or ground based robotic delivery vehicle based on at least one of a corresponding dimensional space or a corresponding weight of each of the inventory items, and an available storage capacity of the delivery container. Alternatively or in addition to, the method may include outputting, by the control circuit, signaling to cause a retail application executable by a customer device to display the listing of selectable items for potential purchase. Alternatively or in addition to, the method may include receiving an indication of a customer selection of one of the selectable items. Alternatively or in addition to, the method may include determining, by the control circuit, subsequent inventory items to include in an updated listing of selectable items for potential purchase by the customer that will be delivered to the customer using the delivery container that is the part of or carried by the aerial or ground based robotic delivery vehicle based on at least one of the corresponding dimensional space or the corresponding weight of each of the subsequent inventory items, and a remaining available storage capacity of the delivery container, wherein each item in the updated listing of selectable items is qualified for inclusion in the remaining available storage capacity. Alternatively or in addition to, the method may outputting, by the control circuit, subsequent signaling to cause the retail application executable by the customer device to display the updated listing of selectable items for potential purchase. Alternatively or in addition to, the method may displaying, by the retail application including computer code executable on the customer device, listings of selectable items for potential purchase on a display of the customer device and allow the customer to select one or more of the items for purchase, each selection resulting in an updated listing displayed by the customer device.

Figure 6:
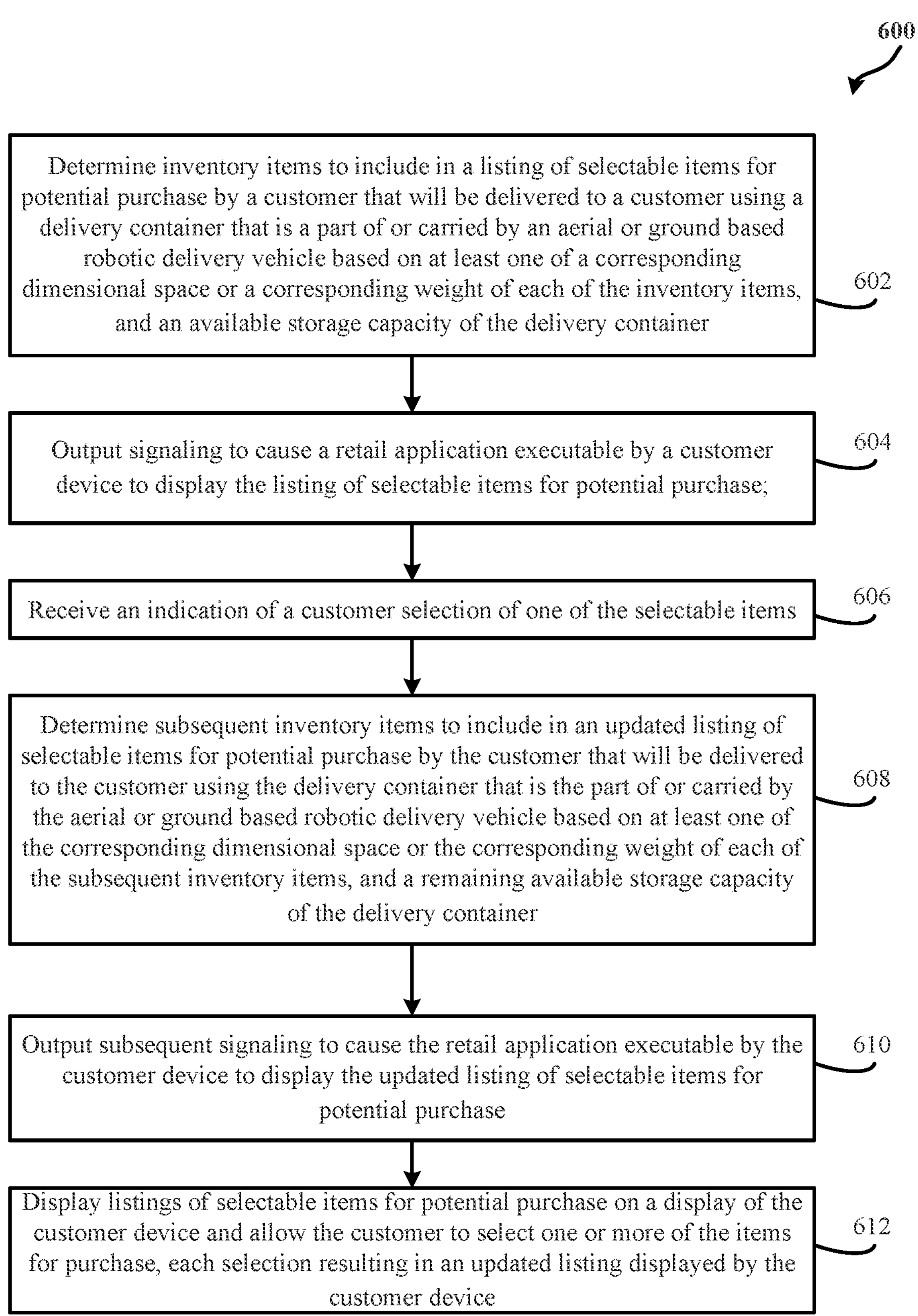
FIG. 6 shows a flow diagram of an exemplary method 600 of displaying items for purchase from a retailer in accordance with some embodiments.

FIGS. 1 and 6 are described concurrently. FIG. 1 illustrates a simplified block diagram of an exemplary system 100 for displaying items for purchase from a retailer 112 in accordance with some embodiments. FIG. 6 shows a flow diagram of an exemplary method 600 of displaying items for purchase from a retailer in accordance with some embodiments. In some embodiments, the system 100 includes a control circuit 102 and/or a retail application 104. The retail application 104 includes computer code executable on a customer device 106 and configured to display, at step 612, listings of selectable items for potential purchase on a display of the customer device 106 and allow the customer to select one or more of items for purchase at a retailer 112 and/or at a retail location of the retailer 112. By one approach, each selection results in an updated listing displayed by the customer device 106. The computer code may be stored in a remote memory accessible by the control circuit 102 and/or the customer device 106. In some embodiments, the customer device 106 downloads the computer code in a memory local to the customer device 106. In some embodiments, the customer device 106 includes a smartphone and a personal computer, to name a few.

In some embodiments, the control circuit 102 determines, at step 602, inventory items to include in a listing of selectable items for potential purchase by a customer that will be delivered to the customer using a delivery container 108 that is a part of or carried by an aerial or ground based robotic delivery vehicle 110 based on at least one of a corresponding dimensional space or a corresponding weight of each of the inventory items, and an available storage capacity of the delivery container 108.

For example, the inventory items are items for purchase that are available at a facility within a threshold distance from a location 114 associated with a customer. By one approach, the location 114 may correspond to the location associated with the customer's profile. By another approach, the location 114 may correspond to the location of the customer device 106. By another approach, the location 114 may correspond to the location provided by the customer during the purchase.

In some embodiments, the control circuit 102 determines the delivery container 108 used to deliver customer-selected items for purchase based on at least one of the facility to fulfill the customer-selected items or the aerial or ground based robotic delivery vehicle paired with the delivery container 108. For example, the facility may own, rent, and/or lease a delivery container 108 used to make a drone delivery. In another example, the delivery container 108 may be paired with and/or assigned to an aerial or ground based robotic delivery vehicle.

In some embodiments, the facility is associated with a retailer 112. In another example, the facility includes a retail store, a fulfillment facility, and/or a distribution center associated with the retailer 112. In some embodiments, the facility is within a threshold distance from a location associated with a customer profile. Alternatively or in addition to, the control circuit 102 outputs, at step 604, signaling to cause the retail application 104 executable by a customer device 106 to display the listing of selectable items for potential purchase. In some embodiments, the control circuit 102 receives, at step 606, an indication of a customer selection of one of the selectable items.

Alternatively or in addition to, the control circuit 102 may determine, at step 608, subsequent inventory items to include in an updated listing of selectable items for potential purchase by the customer that will be delivered to the customer using the delivery container 108 that is the part of or carried by the aerial or ground based robotic delivery vehicle 110 based on at least one of the corresponding dimensional space or the corresponding weight of each of the subsequent inventory items, and a remaining available storage capacity of the delivery container. In an illustrative non-limiting example, after a customer selects an item from the listing of selectable items for potential purchase, the control circuit 102 may cause the retail application 104 to display the updated listing of selectable items for potential purchase. Each item in the updated listing of selectable items is qualified for inclusion in the remaining available storage capacity. For example, each time the customer makes a selection of an item from the displayed list of the retail application 104, the displayed list is updated with items determined by the control circuit 102 to be qualified for inclusion within the remaining available storage capacity based on the dimensional space and/or weight of each of the items, and the remaining available storage capacity after taking into account of the dimensional space and/or weight of the item previously selected, and/or not exceeding a weight limit of the delivery container 108.

Alternatively or in addition to, the control circuit 102 may, at step 610, output subsequent signaling to cause the retail application 104 executable by the customer device 106 to display the updated listing of selectable items for potential purchase. Each item in the updated listing is qualified for inclusion in the remaining available storage capacity. As such, the control circuit 102 may not include an item in the updated listing when the item will cause the weight limit of the delivery container 108 to be exceeded and/or cause the available or remaining dimensional space of the delivery container 108 exceeded or the item will not fit in the available or remaining dimensional space of the delivery container 108.

In some embodiments, the retail application 104 displays a textual and/or a visual indication of the remaining available storage capacity. For example, the retail application 104 causes the display of customer device 106 to show the textual and/or the visual indication of the remaining available storage capacity. Alternatively or in addition to, the textual and/or the visual indication is updated each time a selection is made to show the updated remaining available storage capacity. Thus, a customer knows or made aware of the available storage capacity remaining that allows the customer to continue shopping for items that are within the remaining available storage capacity and/or until there are no more items the control circuit 102 can determine to be includable in the remaining available storage capacity. Additionally, by allowing the customer to know or made aware of the remaining available storage capacity as the customer shops and/or only provides items for selection that are includable and/or within the remaining available storage capacity, the customer's shopping experience is enhanced by not wasting the customer's time to select an item to just find out that the item causes the customer to exceed the remaining available storage capacity and/or causes the customer to have to get a second delivery.

In some embodiments, the system 100 includes a database 116 storing customer transaction data paired with the aerial or ground based robotic delivery vehicle 110 and/or the delivery container 108. For example, the customer transaction data may include customer-selected items for purchase. In such example, each time a customer selects an item, the database 116 may be updated. In some embodiments, the database 116 stores association of a particular customer transaction with a selected and/or assigned aerial or ground based robotic delivery vehicle 110, association of a particular customer transaction with a delivery container 108, and/or association of a particular aerial or ground based robotic delivery vehicle 110 with a particular delivery container 108. In some embodiments, the database 116 includes one or more storage devices or memories capable of storing electronic data.

In some embodiments, the system includes a central database 118 storing a plurality of data from a plurality of disparate data source/s 120. For example, the plurality of data may be associated with an overall item inventories of products for sale at a plurality of facilities associated with a retailer. In some embodiments, the plurality of disparate data source/s 120 includes one or more computers, memories, and/or databases processing and/or storing various data associated with products for sale by the retailer, such as availability, price, current offering and/or promo, of the products, to name a few.

In some embodiments, the system includes an application programming interface (API) 122. The API 122 may couple the central database 118 with the database 116 to allow the central database 118 to be updated each time the database 116 is updated. For example, when a customer makes a selection, the database 116 may be updated. In response, the control circuit 102 may cause the central database 118 to be updated via the API to indicate that the corresponding product inventory associated with the item has been reduced. Alternatively or in addition to, a customer unselecting and/or removing the selected item from a listing of selected items to be purchase may cause the central database 118 to be updated by the control circuit 102 via the API to indicate that the corresponding product inventory associated with the unselected item has been increased. In an illustrative non-limiting example, the control circuit 102 may update the central database 118 via the API 122 in response to the control circuit 102 updating the database 116 whenever one or more of the selectable items are selected for purchase via the retail application 104. Alternatively or in addition to, each update to the central database 118 may correspond to an increase and/or a decrease on a quantity of an item in the overall item inventories of products for sale based on the item being selected or unselected by the customer via the retail application 104.

Figure 2B:
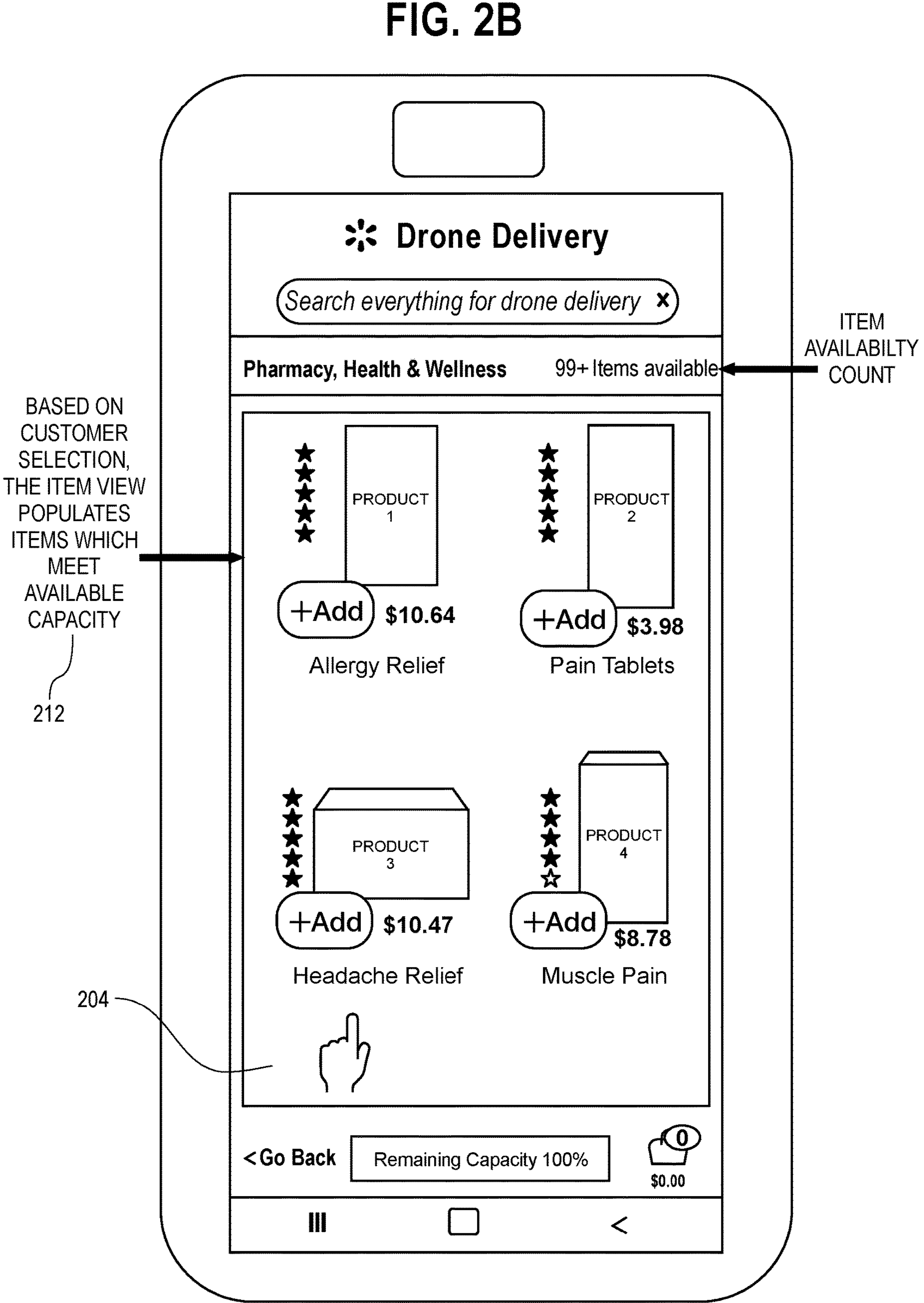

FIG. 2A-2G are schematic illustrations of an example retail application 104 for displaying items for purchase from a retailer in accordance with some embodiments. For example, in FIG. 2A, a customer is making a category selection of an item. Additionally, the retail application 104 shows the remaining available storage capacity via an indicator 202 displayed on the retail application 104. Given that the customer has not made a selection, the indicator 202 shows that the remaining available storage capacity is 100%. In FIG. 2B, the customer is selecting an item at 204. Additionally, at 212, the items displayed on the retail application 104 in FIG. 2B are those items that meet or qualify for inclusion in the remaining available storage capacity as described herein.

Figure 2C:
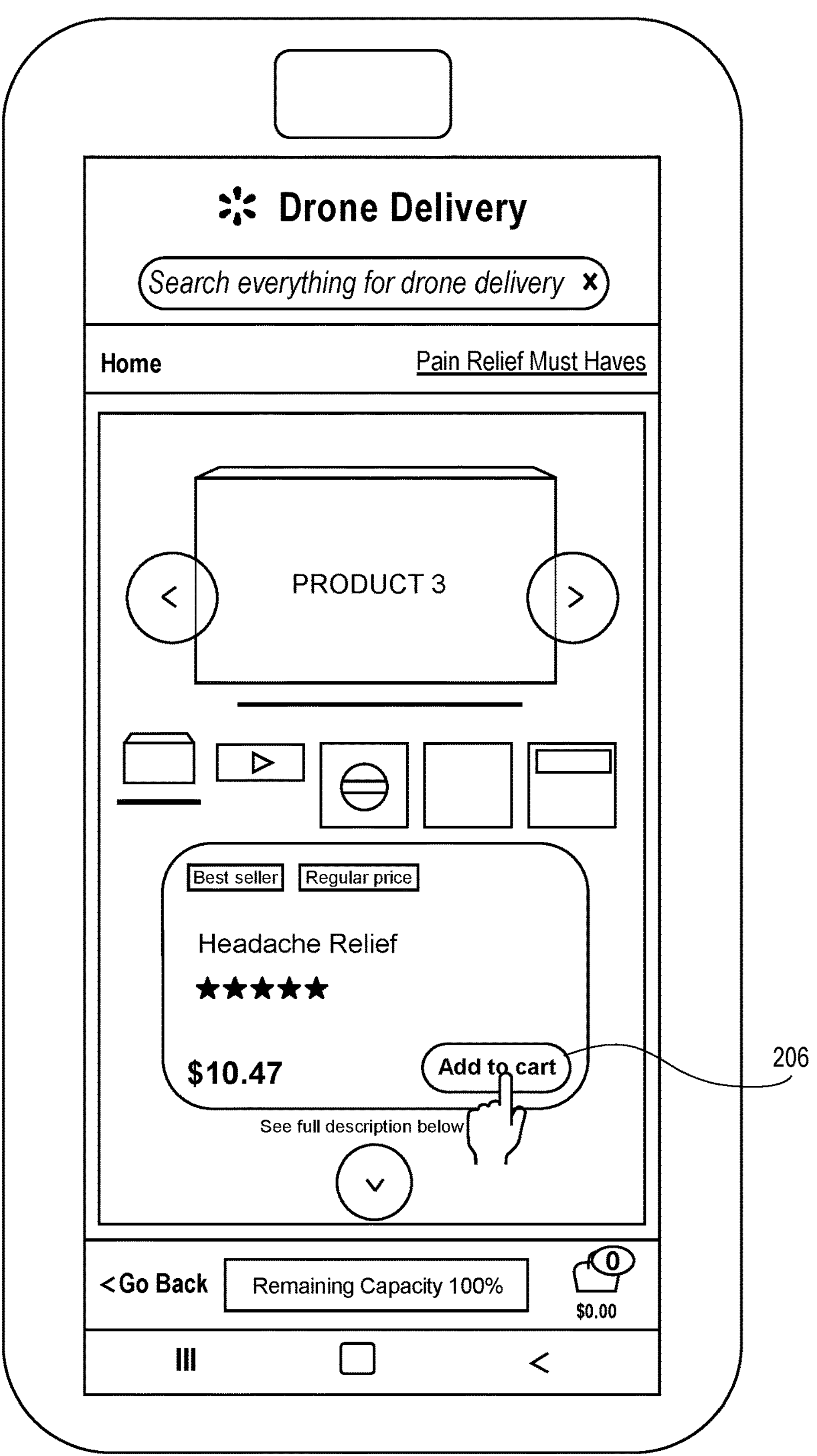
Figure 2D:
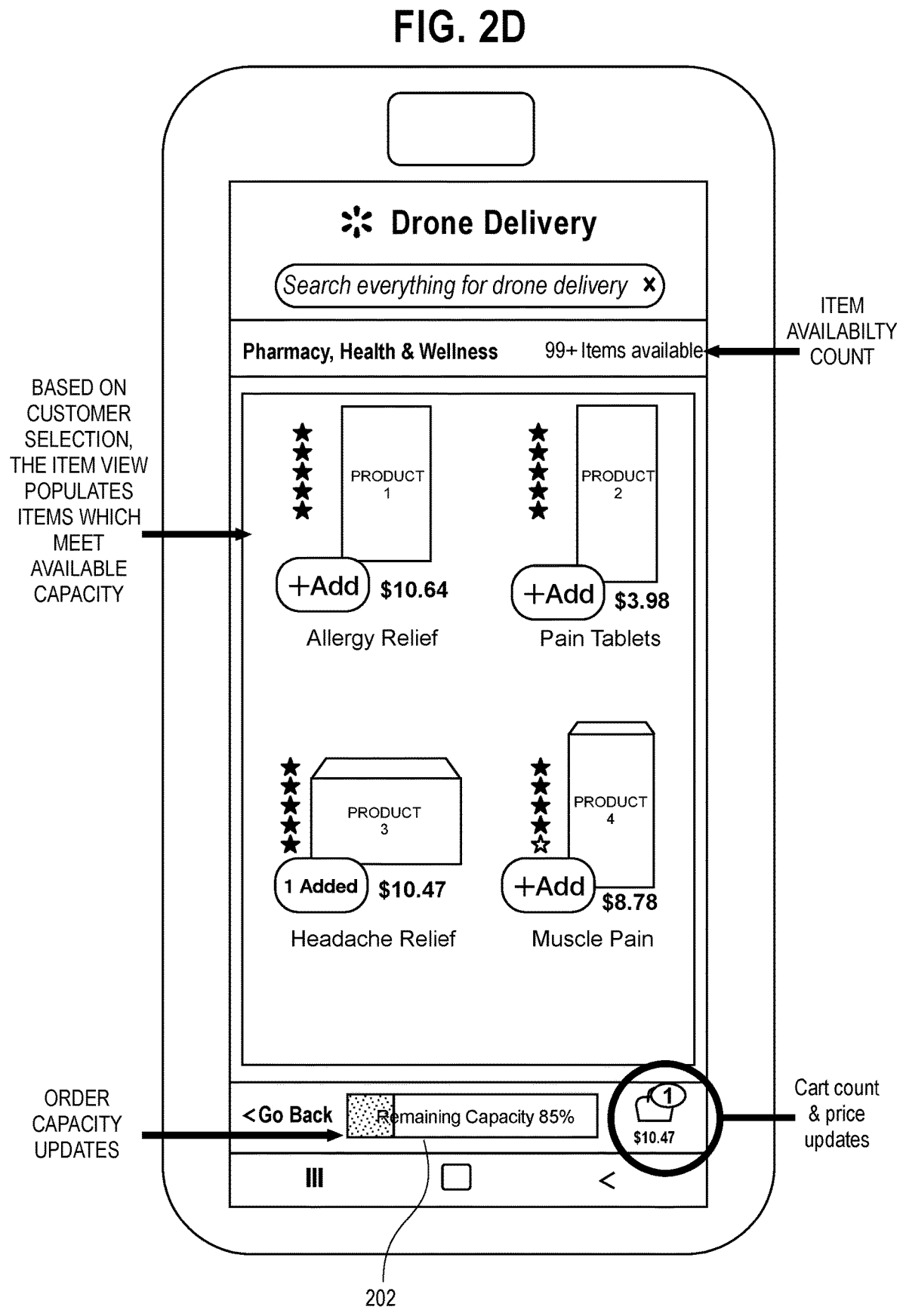
Figure 2E:
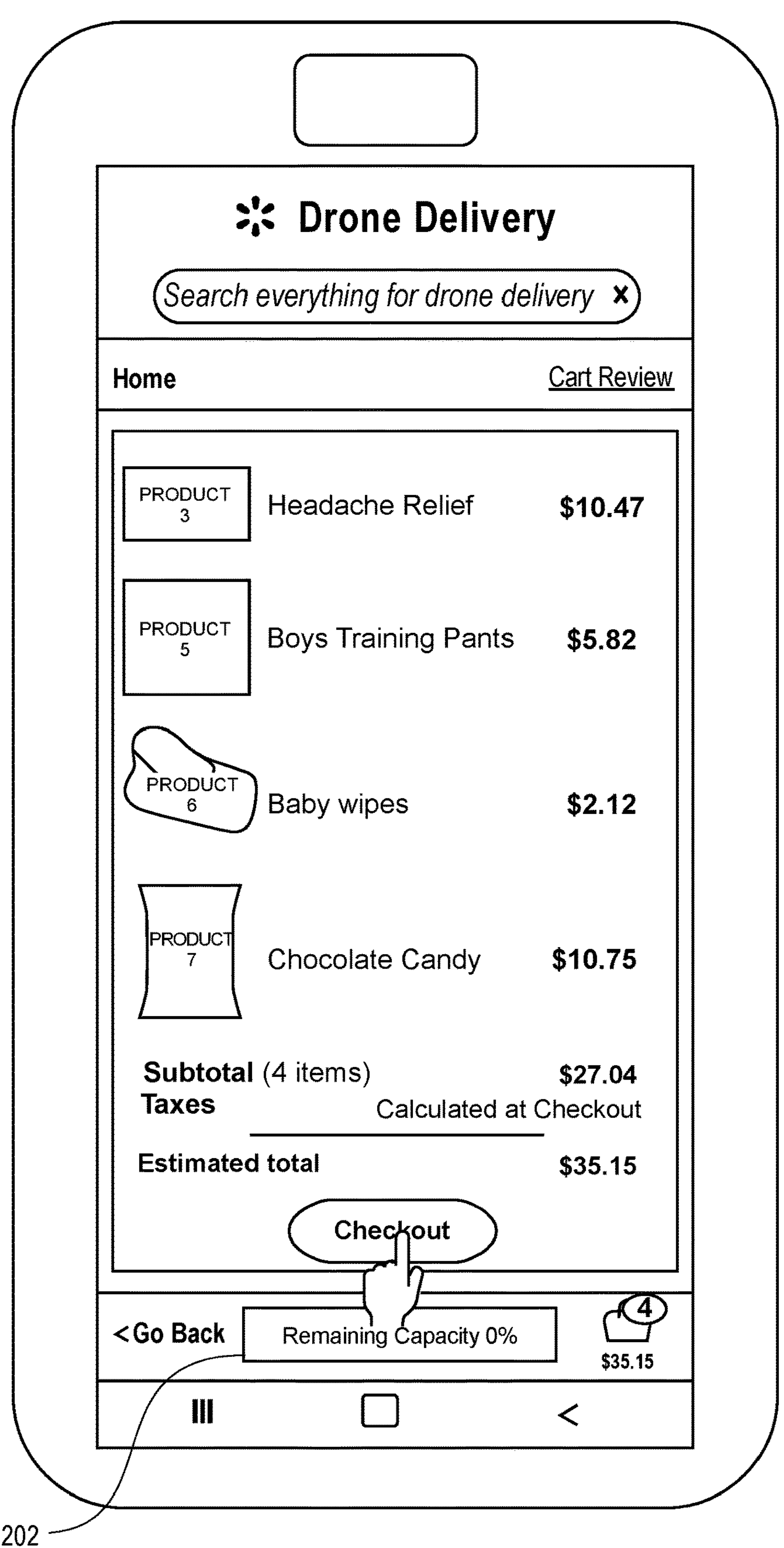
Figure 2F:
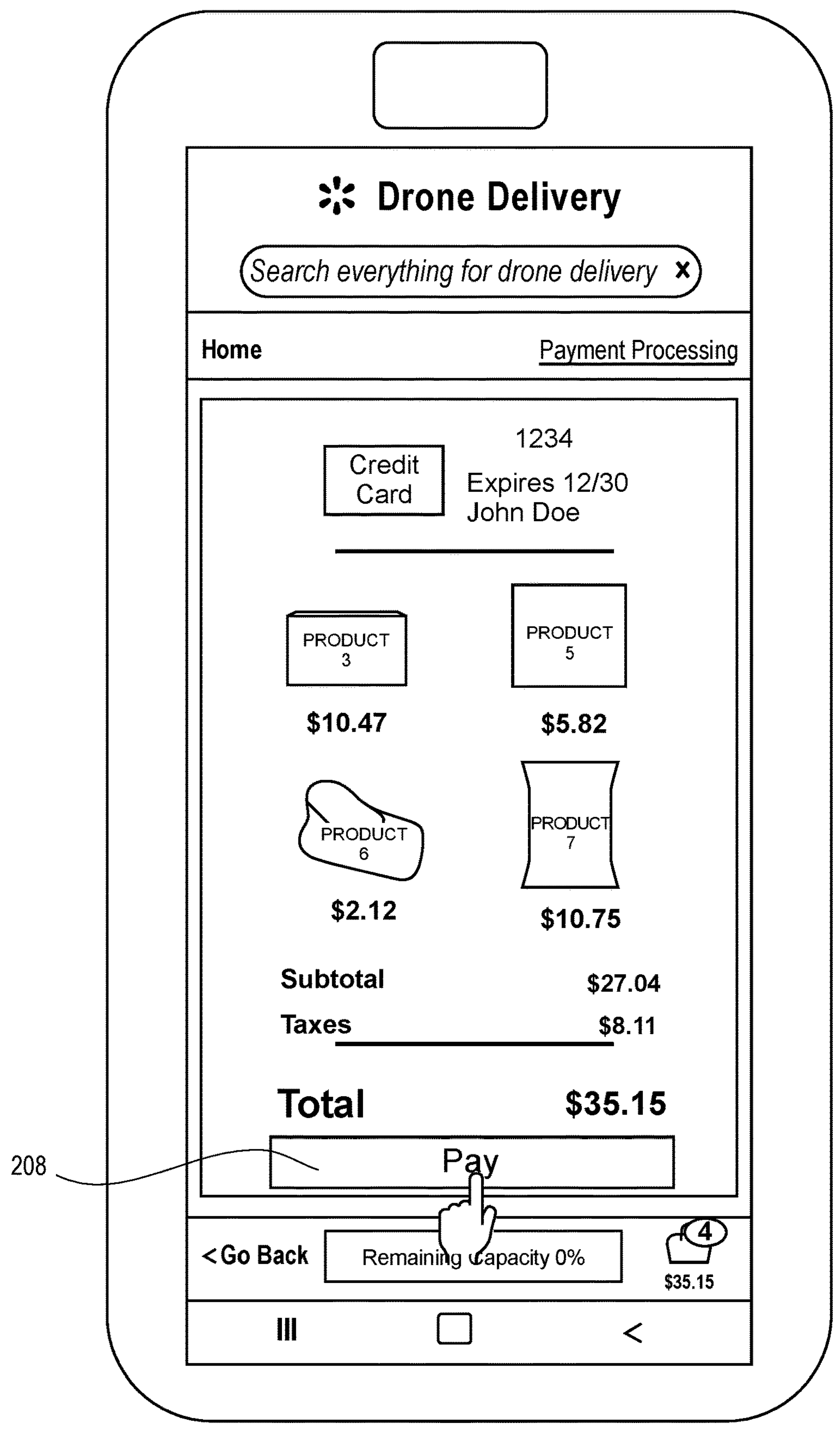
Figure 2G:
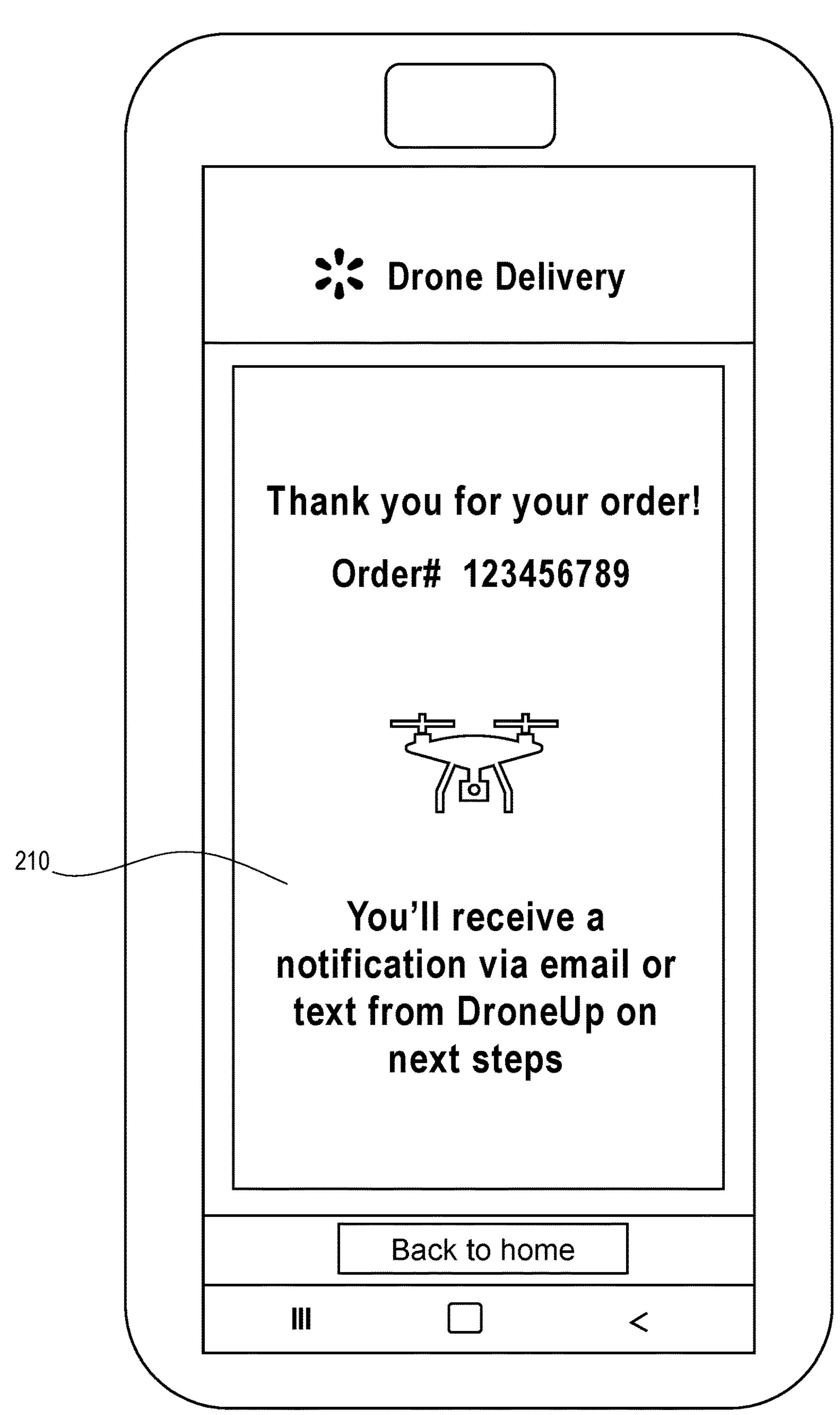

In some embodiments, in FIG. 2C, the customer is selecting an item when the customer adds the item in an electronic shopping cart and/or the like at 206. In response to the selection of the item, the indicator 202 in FIG. 2D is now showing that the remaining available storage capacity is 85%. In FIG. 2E, the indicator 202 is showing that the remaining available storage capacity is 0%. In FIG. 2F, the customer is completing the purchase transaction at 208. In FIG. 2G, the retail application 104 displays a confirmation message 210 indicating that purchase transaction has been completed and a notification message will be provided at 210.

Figure 3A:
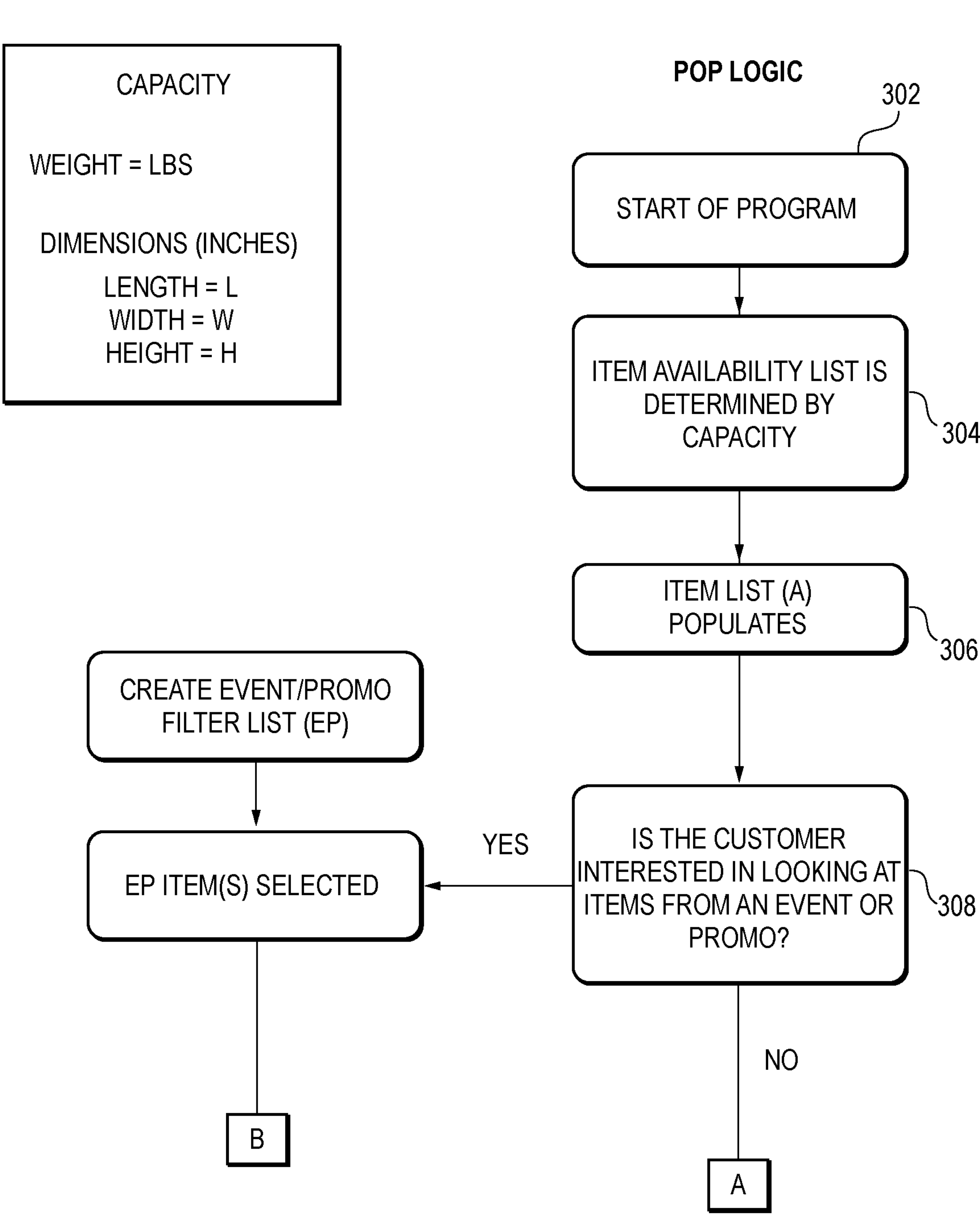
FIGS. 3A-3C show a flow diagram of an exemplary method of displaying items for purchase from a retailer in accordance with some embodiments.
Figure 3B:
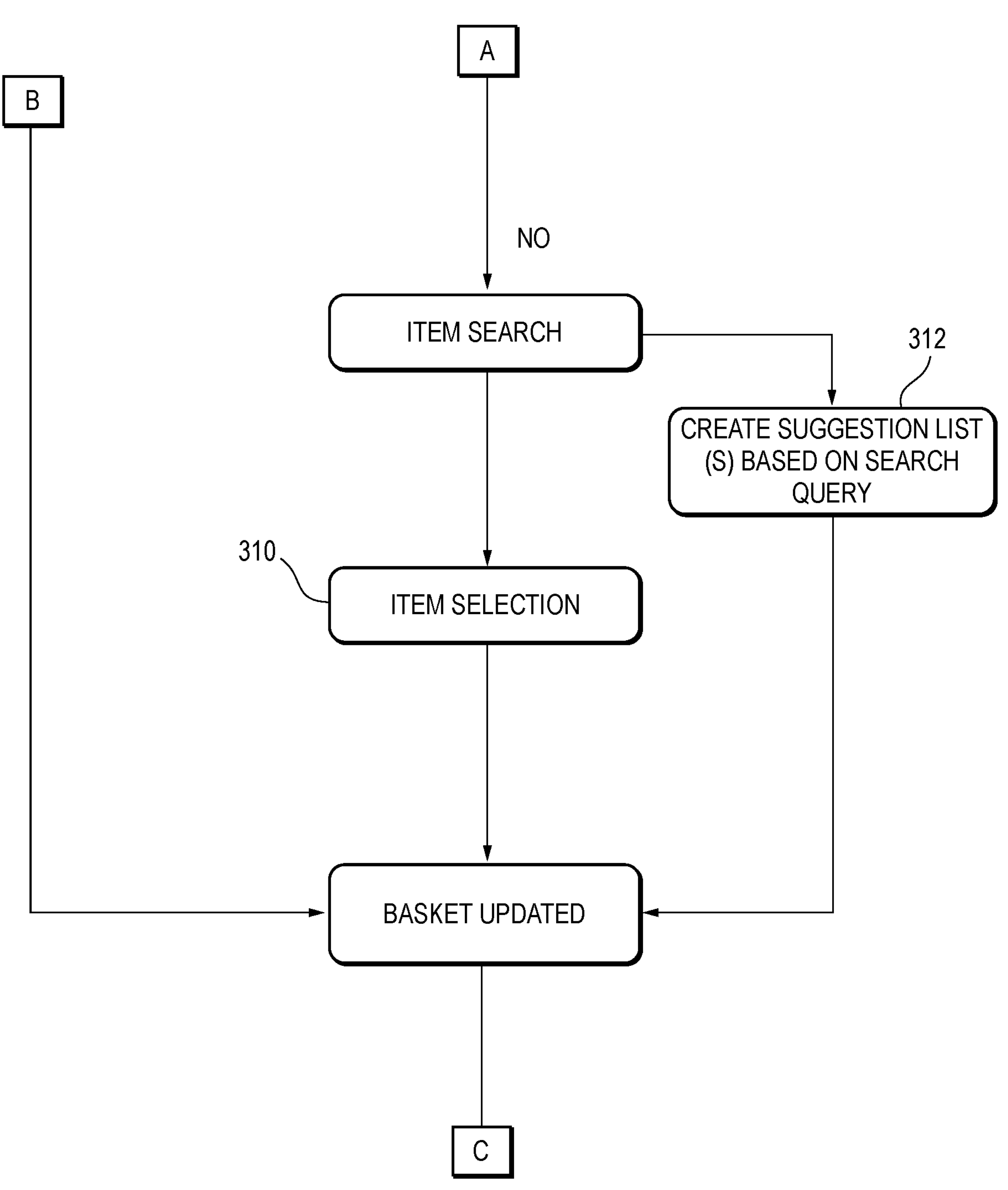
Figure 3C:
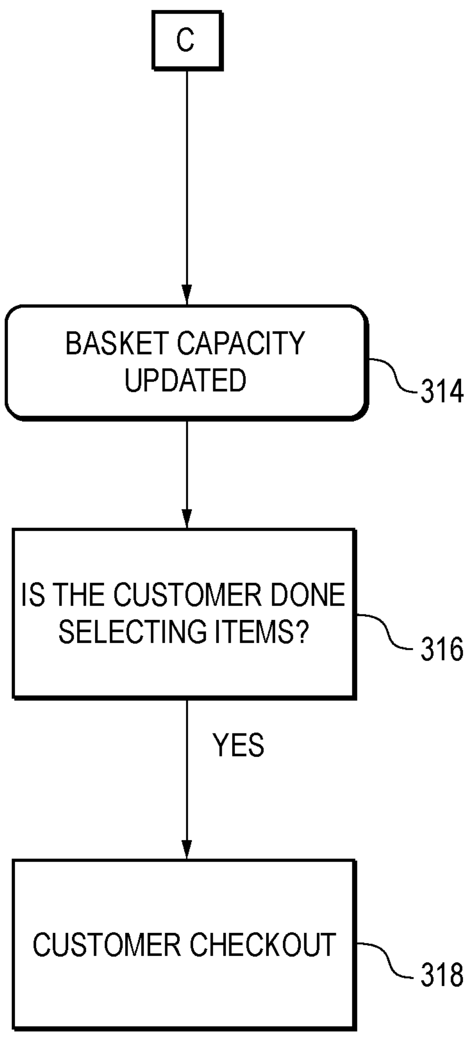

FIGS. 3A-3C show a flow diagram of an exemplary method 300 of displaying items for purchase from a retailer in accordance with some embodiments. At step 302, the retail application 104 is started. At step 304, the control circuit 102 may determine inventory items to include in a listing of selectable items for potential purchase by a customer based on at least one of a corresponding dimensional space or a corresponding weight of each of the inventory items, and an available storage capacity of a delivery container 108. At step 306, the listing of selectable items may be shown on the retail application 104. At step 308, the control circuit 102 may further narrow the inventory items in the listing based on whether the customer is interested in items from an event and/or a promo. At step 310, the customer makes a selection. In some embodiments, at steps 312, the control circuit 102 may create and/or determine a suggestion list based on the customer's search query. In response to the customer's selection of one or more items in the listing, the control circuit 102 causes, at step 314, the remaining available storage capacity to be updated as exemplified by the indicator 202 of FIG. 2D. The retail application 104 may prompt the customer on whether the customer is done selecting items at step 316. In response to the customer's input corresponding to a response of done selecting items, the retail application 104 may prompt the customer to complete the purchase transaction at 318.

FIG. 4 shows a flow diagram of an exemplary method 400 of displaying items for purchase from a retailer in accordance with some embodiments. In an illustrative non-limiting example, steps 402 through 408 in FIG. 4 exemplify the one or more steps performed by the control circuit 102 to determine the subsequent inventory items to include in an updated listing of selectable items for potential purchase by the customer based on at least one of the corresponding dimensional space or the corresponding weight of each of the subsequent inventory items, and a remaining available storage capacity of the delivery container. For example, at step 402 of FIG. 4, the control circuit 102 may filter the list of items in step 306 of FIG. 3A. In some embodiments, at step 404, the control circuit 102 further narrows down the filtered list of items based on the remaining weigh capacity of the delivery container 108 and/or the aerial or ground based robotic delivery vehicle 110. In some embodiments, at step 406, the control circuit 102 further narrows down the resulting list from step 404 based on the remaining dimension capacity. In response, at step 408, a new list may be created for which the customer may make a selection from the new list.

Figure 5A:
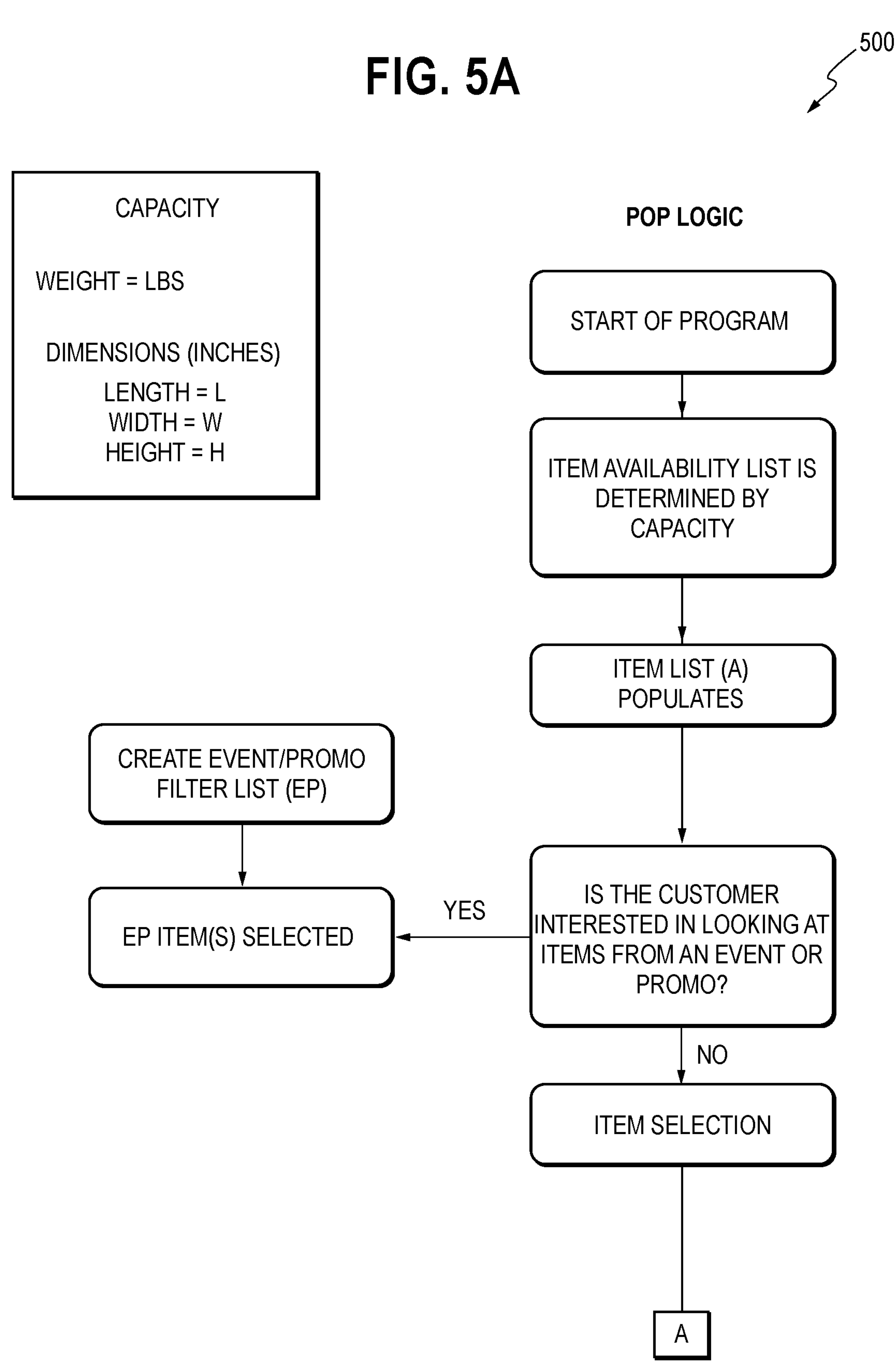
Figure 5B:
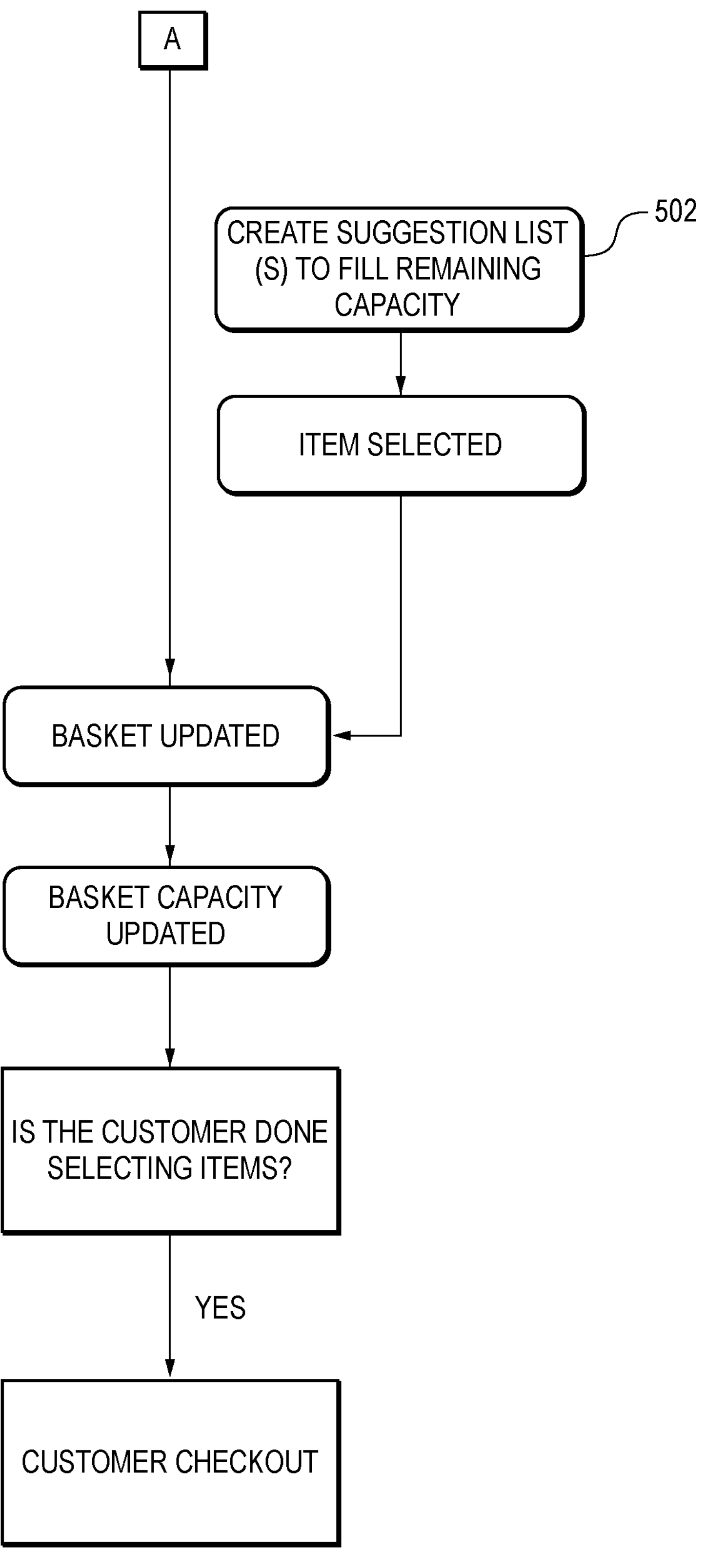

FIGS. 5A-5C show a flow diagram of an exemplary method 500 of displaying items for purchase from a retailer in accordance with some embodiments. In another illustrative non-limiting example, steps 502 through 510 in FIGS. 5A-5C exemplify the one or more steps performed by the control circuit 102 to determine the subsequent inventory items to include in an updated listing of selectable items for potential purchase by the customer based on at least one of the corresponding dimensional space or the corresponding weight of each of the subsequent inventory items, and a remaining available storage capacity of the delivery container. For example, at step 502 of FIG. 5B, the control circuit 102 may create a suggested list of items selectable by the customer to fill the remaining available storage capacity. The customer may select multiple items from the suggested list. At step 504, the control circuit 102 may determine whether the selected items from the suggested list exceed weight or dimensional space of the remaining available storage capacity. At step 506, the control circuit 102 may determine whether the selected items from the suggested list or the total number of items exceed weight capacity of the remaining available storage capacity. At step 508, if overcapacity, the control circuit 102 may cause the retail application 104 to display a notification to the customer of overcapacity. In response, at step 510, the control circuit 102 may cause the retail application 104 to redisplay the initial inventory of items that qualify to be includable in the available storage capacity that is the storage capacity associated with an empty delivery container 108.

Figure 7:
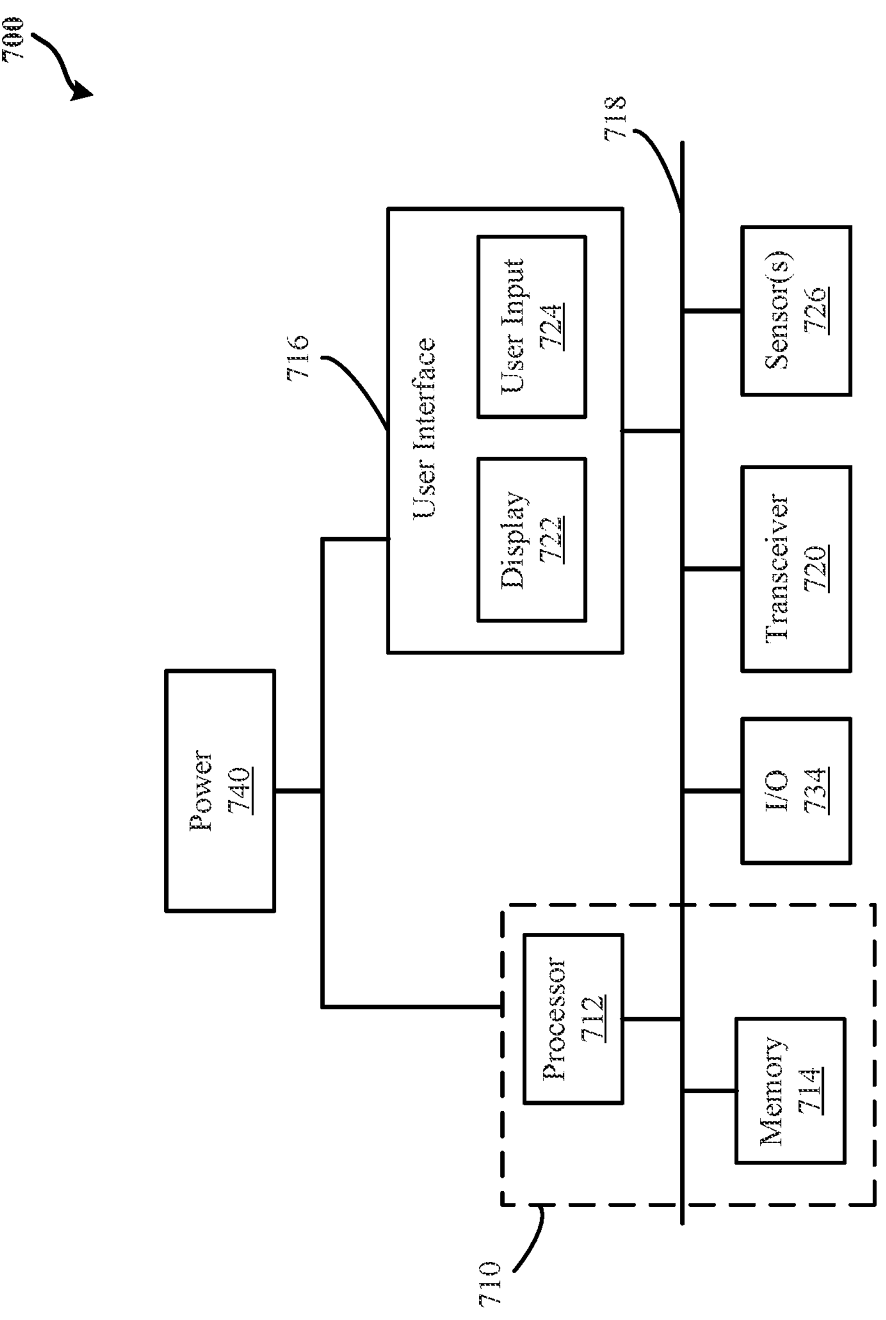
FIG. 7 illustrates an exemplary system for use in implementing methods, techniques, devices, apparatuses, systems, servers, sources and displaying items for purchase from a retailer in accordance with some embodiments.

Further, the circuits, circuitry, systems, devices, processes, methods, techniques, functionality, services, servers, sources and the like described herein may be utilized, implemented and/or run on many different types of devices and/or systems. FIG. 7 illustrates an exemplary system 700 that may be used for implementing any of the components, circuits, circuitry, systems, functionality, apparatuses, processes, or devices of the system 100 of FIG. 1, the retail application 104 of FIGS. 2A-2G, the method 300 of FIG. 3, the method 400 of FIG. 4, the method 500 of FIG. 5, and/or other above or below mentioned systems or devices, or parts of such circuits, circuitry, functionality, systems, apparatuses, processes, or devices. For example, the system 700 may be used to implement some or all of the system for displaying items for purchase from a retailer, the control circuit 102, the retail application 104, the database 116, the central database 118 the plurality of disparate data source/s 120, the aerial or ground based robotic delivery vehicle 110, the API 122, the customer device 106, and/or other such components, circuitry, functionality and/or devices. However, the use of the system 700 or any portion thereof is certainly not required.

By way of example, the system 700 may comprise a processor module (or a control circuit) 712, memory 714, and one or more communication links, paths, buses or the like 718. Some embodiments may include one or more user interfaces 716, and/or one or more internal and/or external power sources or supplies 740. The control circuit 712 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 712 can be part of control circuitry and/or a control system 710, which may be implemented through one or more processors with access to one or more memory 714 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 700 may be used to implement one or more of the above or below, or parts of, components, circuits, systems, processes and the like. For example, the system 700 may implement the system for displaying items for purchase from a retailer with the control circuit 102 being the control circuit 712.

The user interface 716 can allow a user to interact with the system 700 and receive information through the system. In some instances, the user interface 716 includes a display 722 and/or one or more user inputs 724, such as buttons, touch screen, track ball, keyboard, mouse, etc., which can be part of or wired or wirelessly coupled with the system 700. Typically, the system 700 further includes one or more communication interfaces, ports, transceivers 720 and the like allowing the system 700 to communicate over a communication bus, a distributed computer and/or communication network (e.g., a local area network (LAN), the Internet, wide area network (WAN), etc.), communication link 718, other networks or communication channels with other devices and/or other such communications or combination of two or more of such communication methods. Further the transceiver 720 can be configured for wired, wireless, optical, fiber optical cable, satellite, or other such communication configurations or combinations of two or more of such communications. Some embodiments include one or more input/output (I/O) interface 734 that allow one or more devices to couple with the system 700. The I/O interface can be substantially any relevant port or combinations of ports, such as but not limited to USB, Ethernet, or other such ports. The I/O interface 734 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 726 to provide information to the system and/or sensor information that is communicated to another component, such as the control circuit 102, the retail application 104, the database 116, the central database 118 the plurality of disparate data source/s 120, the aerial or ground based robotic delivery vehicle 110, the API 122, the customer device 106, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 700 comprises an example of a control and/or processor-based system with the control circuit 712. Again, the control circuit 712 can be implemented through one or more processors, controllers, central processing units, logic, software and the like. Further, in some implementations the control circuit 712 may provide multiprocessor functionality.

The memory 714, which can be accessed by the control circuit 712, typically includes one or more processor readable and/or computer readable media accessed by at least the control circuit 712, and can include volatile and/or nonvolatile media, such as RAM, ROM, EEPROM, flash memory and/or other memory technology. Further, the memory 714 is shown as internal to the control system 710; however, the memory 714 can be internal, external or a combination of internal and external memory. Similarly, some or all of the memory 714 can be internal, external or a combination of internal and external memory of the control circuit 712. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 714 can store code, software, executables, scripts, data, content, lists, programming, programs, log or history data, user information, customer information, product information, and the like. While FIG. 7 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for displaying items for purchase from a retailer, the system comprising:

a retail application comprising computer code executable on a customer device and configured to display listings of selectable items for potential purchase on a display of the customer device and allow a customer to select one or more of the items for purchase, each selection resulting in an updated listing displayed by the customer device; and a control circuit configured to:

determine inventory items to include in a listing of selectable items for potential purchase by the customer that will be delivered to the customer using a delivery container that is a part of or carried by an aerial or ground based robotic delivery vehicle based on a corresponding dimensional space and a corresponding weight of each of the inventory items, and an available capacity of the delivery container;

output signaling to cause a retail application executable by a customer device to display the listing of selectable items for potential purchase and to display a graphical indication of a remaining available dimensional space capacity of the delivery container;

receive an indication of a customer selection of one of the selectable items;

in response to the received indication of the customer selection of the one of the selectable items:

determine subsequent inventory items to include in the updated listing of selectable items for potential purchase by the customer that will be delivered to the customer using the delivery container that is the part of or carried by the aerial or ground based robotic delivery vehicle based on at least one of the corresponding dimensional space and the corresponding weight of each of the subsequent inventory items, and the remaining available dimensional space capacity of the delivery container, wherein each item in the updated listing of selectable items is qualified for inclusion in the remaining available dimensional space capacity of the delivery container; and output subsequent signaling to cause the retail application executable by the customer device to display the updated listing of selectable items for potential purchase that will satisfy the remaining available dimensional space of the delivery container and the remaining available weight of the delivery container, and to display an updated graphical indication corresponding to an updated remaining available dimensional space capacity of the delivery container.

2. The system of claim 1, wherein the customer device comprises a smartphone and a personal computer.

3. The system of claim 1, further comprising a database configured to store customer transaction data paired with at least one of the aerial or ground based robotic delivery vehicle or the delivery container, the customer transaction data comprising customer-selected items for purchase.

4. The system of claim 1, wherein the control circuit is further configured to determine the delivery container used to deliver customer-selected items for purchase based on at least one of a facility to fulfill the customer-selected items or the aerial or ground based robotic delivery vehicle paired with the delivery container.

5. The system of claim 4, wherein the facility is within a threshold distance from a location associated with a customer profile.

6. The system of claim 1, further comprising:

a central database configured to store a plurality of data from a plurality of disparate data sources associated with an overall item inventories of products for sale at a plurality of facilities;

a database is configured to separately store each corresponding customer transaction data paired with at least one of a corresponding aerial or ground based robotic delivery vehicle or a corresponding delivery container, the corresponding customer transaction data comprising corresponding customer-selected items for purchase; and an application programming interface (API) configured to couple the central database with the database to allow the central database to be updated each time the database is updated.

7. The system of claim 6, wherein the control circuit is further configured to update the central database via the API in response to the control circuit updating the database whenever one or more of the selectable items are selected for purchase via the retail application.

8. The system of claim 7, wherein each update to the central database corresponds to at least one of an increase or a decrease on a quantity of a particular item in the overall item inventories of products for sale based on the particular item being selected or unselected by the customer via the retail application.

9. A method for displaying items for purchase from a retailer, the method comprising:

displaying a retail application comprising computer code executable on a customer device and configured to display listings of selectable items for potential purchase on a display of the customer device and allow a customer to select one or more of the items for purchase, each selection resulting in an updated listing displayed by the customer device; and determining, by a control circuit, inventory items to include in a listing of selectable items for potential purchase by the customer that will be delivered to the customer using a delivery container that is a part of or carried by an aerial or ground based robotic delivery vehicle based on a corresponding dimensional space and a corresponding weight of each of the inventory items, and an available capacity of the delivery container;

outputting, by the control circuit, signaling to cause a retail application executable by a customer device to display the listing of selectable items for potential purchase and to display at least one of a textual or a visual a graphical indication of a remaining available dimensional space capacity of the delivery container;

receiving, by the control circuit, an indication of a customer selection of one of the selectable items;

in response to the received indication of the customer selection of the one of the selectable items:

determining, by the control circuit, subsequent inventory items to include in the updated listing of selectable items for potential purchase by the customer that will be delivered to the customer using the delivery container that is the part of or carried by the aerial or ground based robotic delivery vehicle based on the corresponding dimensional space and the corresponding weight of each of the subsequent inventory items, and the remaining available dimensional space capacity of the delivery container, wherein each item in the updated listing of selectable items is qualified for inclusion in the remaining available dimensional space capacity of the delivery container;

outputting, by the control circuit, subsequent signaling to cause the retail application executable by the customer device to display the updated listing of selectable items for potential purchase that will satisfy the remaining available dimensional space of the delivery container and the remaining available weight of the delivery container, and to display an updated graphical indication corresponding to an updated remaining available dimensional space capacity of the delivery container.

10. The method of claim 9, wherein the customer device comprises a smartphone and a personal computer.

11. The method of claim 9, further comprising storing, by a database, customer transaction data paired with at least one of the aerial or ground based robotic delivery vehicle or the delivery container, the customer transaction data comprising customer-selected items for purchase.

12. The method of claim 9, further comprising determining, by the control circuit, the delivery container used to deliver customer-selected items for purchase based on at least one of a facility to fulfill customer-selected items or the aerial or ground based robotic delivery vehicle paired with the delivery container.

13. The method of claim 12, wherein the facility is within a threshold distance from a location associated with a customer profile.

14. The method of claim 9, further comprising:

storing, by a central database, a plurality of data from a plurality of disparate data sources associated with an overall item inventories of products for sale at a plurality of facilities;

separately storing, by a database, each corresponding customer transaction data paired with at least one of a corresponding aerial or ground based robotic delivery vehicle or a corresponding delivery container, the corresponding customer transaction data comprising corresponding customer-selected items for purchase; and coupling, by an application programming interface (API), the central database with the database to allow the central database to be updated each time the database is updated.

15. The method of claim 14, further comprising updating, by the control circuit, the central database via the API in response to the control circuit updating the database whenever one or more of the selectable items are selected for purchase via the retail application.

16. The method of claim 15, wherein each update to the central database corresponds to at least one of an increase or a decrease on a quantity of a particular item in the overall item inventories of products for sale based on the particular item being selected or unselected by the customer via the retail application.

* * * * *